United States Patent
Ranganathan et al.

(10) Patent No.: US 12,292,975 B2
(45) Date of Patent: May 6, 2025

(54) METHOD, SYSTEM AND APPARATUS TO PREVENT DENIAL OF SERVICE ATTACKS ON PCIe BASED COMPUTING DEVICES

(71) Applicant: Intel Corporation, Santa Clara, CA (US)

(72) Inventors: Sriram Ranganathan, Bangalore (IN); Pannerkumar Rajagopal, Bangalore (IN); Saravanakumar Ulaganathan, Bangalore (IN); Siddhartha Selvaraj, Coimbatore (IN); Radhakrishna Pai, Bangalore (IN)

(73) Assignee: Intel Corporation, Santa Clara, CA (US)

(*) Notice: Subject to any disclaimer, the term of this patent is extended or adjusted under 35 U.S.C. 154(b) by 275 days.

(21) Appl. No.: 17/705,747

(22) Filed: Mar. 28, 2022

(65) Prior Publication Data
US 2022/0215099 A1    Jul. 7, 2022

(51) Int. Cl.
*G06F 21/57*   (2013.01)
*G06F 15/78*   (2006.01)
*G06F 21/00*   (2013.01)

(52) U.S. Cl.
CPC .......... *G06F 21/57* (2013.01); *G06F 15/7807* (2013.01); *G06F 21/00* (2013.01)

(58) Field of Classification Search
CPC ...... G06F 21/57; G06F 15/7807; G06F 21/00; G06F 21/554; G06F 21/85
See application file for complete search history.

(56) References Cited

U.S. PATENT DOCUMENTS

| | | | | |
|---|---|---|---|---|
| 5,862,389 A | * | 1/1999 | Kardach | G06F 9/4812 710/266 |
| 6,862,641 B1 | * | 3/2005 | Strongin | G06F 21/72 726/17 |
| 6,907,521 B2 | * | 6/2005 | Saw-Chu | G06F 9/4812 713/1 |
| 7,043,581 B1 | * | 5/2006 | Gulick | G06F 21/71 710/240 |
| 2003/0028781 A1 | * | 2/2003 | Strongin | G06F 9/24 712/E9.007 |
| 2011/0083023 A1 | * | 4/2011 | Dickens | G06F 1/3228 709/224 |
| 2020/0133679 A1 | * | 4/2020 | Brandt | G06F 9/30101 |

* cited by examiner

*Primary Examiner* — J. Brant Murphy
(74) *Attorney, Agent, or Firm* — HANLEY, FLIGHT & ZIMMERMAN, LLC (57) ABSTRACT

The disclosure generally relates method, system and apparatus to prevent denial of service (DOS) attacks on PCIe based computing devices. In an exemplary embodiment, an independent register is used in combination with a filter driver and additional logic to form an integrity check for power down instructions. An exemplary system includes a register circuitry corresponding to the IP device, the register circuitry having a designated storage bit to indicate an unlocked state of the register; a filter driver to receive a first power state transition request when the IP device is idle after a predetermined period, the power state transition request defining a timeout period; a controller to change the power state of the IP device to the unlock state; a decision logic to receive and authenticate a second power state transition request in response to validation of register circuitry being unlocked.

24 Claims, 8 Drawing Sheets

| Bit | Description |
|---|---|
| 0 | 1-Lock power down request for Graphics (default value)<br>0-Unlock power down request for Graphics |
| 1 | 1-Lock power down request for Storage (default value)<br>0-Unlock power down request for Storage |
| 2 | 1-Lock power down request for WiFi (default value)<br>0-Unlock power down request for WiFi |
| 3-31 | Reserved (can be used for more IPs) |

METHOD, SYSTEM AND APPARATUS TO PREVENT DENIAL OF SERVICE ATTACKS ON PCIe BASED COMPUTING DEVICES

FIELD

The instant disclosure generally relates to method, system and apparatus to prevent denial-of-service (DOS) attacks on computing devices. In one embodiment, the disclosure provides method, system and apparatus to prevent DOS attacks on peripheral component interconnect express (PCIe) based computing devices.

BACKGROUND

Denial of service attacks have become a common occurrence. Denial of service attacks present themselves in a verity of different ways, including, for example a locked Intellectual Property (IP) device such as a graphics card or an unresponsive keyboard or printer.

All IP device controllers in a System-On-Chip (SoC) follow the PCIe specification, which provides IP device power management (i.e., power ON/OFF) through power management capability and status register (PMCSR). The latter register is exposed to the processor and any software/tool that can execute on the processor can access this register. This exposes a security vulnerability through which malicious tools/software can power down the IP device illegally and lead to DOS attacks on all computing devices (i.e., servers, data centers, internet of things, desktops, laptops, tablets, etc.) which leads to poor user experience, significant downtime and irrevocable data loss.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In certain disclosed embodiments, the above shortcomings are overcome by adding an additional secure path to determine whether IP driver power management access request is legitimate or malicious. The secure path may comprise a register, a filter and one or more decision logics. The register may be added to the Power Management Controller (PMC) of the System-on-Chip (SoC). The filter driver may comprise an inter-driver mechanism that is interposed between the function driver and the IP device (or the bus driver) to trigger System Management Interrupt (SMI) message specific to the platform when it is notified of a low power request coming from the kernel. Once engaged, the filter driver engages the BIOS to unlock actions bit in the System Management Mode (SMM). Conventionally, SMM runs in the form of interrupt handlers that are triggered by timers or access to certain memory, registers, or hardware resources. Finally, a decision logic may be added to the PMC to determine if the power management access request is legit or malicious.

Figure 1:
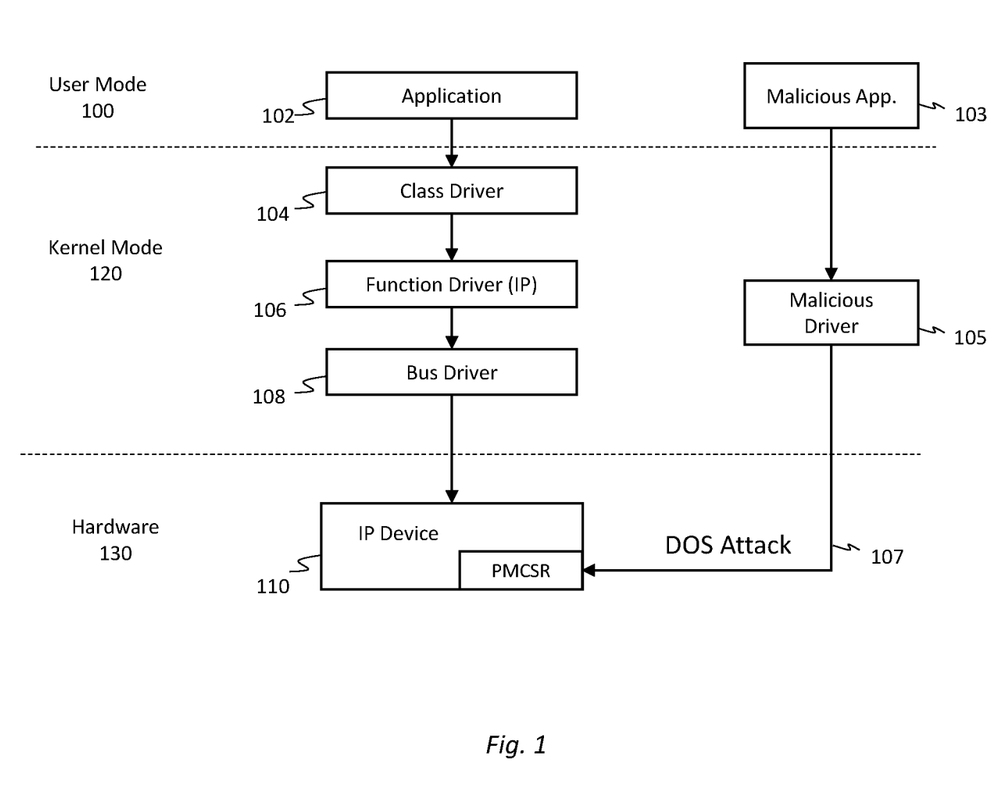
FIG. 1 schematically illustrates the phases of an exemplary implementation of the disclosure.

FIG. 1 schematically illustrates the vulnerability of a conventional devices from kernel mode. As discussed, in the conventional architecture any software in the kernel mode can access any device's power management register (PMCSR) and can turn off/on the IP device without the knowledge of the corresponding device driver. Specifically, FIG. 1 illustrates User Mode 100 having legitimate software application 102 and malicious application 103. To execute in the IP device 110, Software application 102 communicates through class driver 104, function driver 106 and bus driver 108 which are in the kernel mode at the core of the computing system. The kernel mode may also comprise malicious driver 105 in communication with malicious application 103.

While FIG. 1 shows only one IP device 110, a typical computing system may comprise a plurality of IP devices 110. IP device 110 may be integrated in an SoC. In some embodiments, a plurality of IP devices 110 are formed in a single SoC. This is further illustrated below with reference to FIG. 2. Each IP device (interchangeably, IP) may comprise a different function and purpose. Exemplary IP devices include, graphic devices, USB storage device and keyboard/mouse device. Each IP device 110 comprises Power Management Control and Status Register (PMCSR) which controls the power to the IP device. For example, PMCSR determines when to place associated IP device 110 into power save state. PMCSR is implemented in the IP and is accessible to public which invites security concerns as it can be attacked through a malicious software/driver. Conventional device power states range from $D_0$ to $D_3$ which correspond to device ON ($D_0$) to device in deep sleep ($D_3$). There is no operation latency at state $D_0$ and there may be significant operation latency associated with $D_3$. Executing malicious code 103 may irretrievably turn off IP device 110. The malicious code may cause irreversible DOS.

In one embodiment, the disclosure addresses the vulnerability of the conventional systems by disabling the default power down request and mechanism of all IP devices. This prevents malicious application 103 from powering down the device and prevents the system from DOS attacks.

In one implementation, the power down request actions via PMCSR and the potential malicious DOS instructions may be locked by creating a default mode in which the power management of the IP device 110 is controlled not through PMCSR (and ostensibly through malicious app 103) but through the SoC (and specifically a register) on which the IP device is formed. The locking action blocks malicious driver/applications from powering down the IP device and prevents DOS attacks. To allow the required power down flow, a filter driver may be added to each IP driver to generate an SMI message during a legitimate power down request received from the kernel. In the System Management Mode (SMM), BIOS will program the IP specific bit (i.e., the register bit associated with a given IP device such as Unlock_lock_enable register) to unlock the power down actions. This register (Unlock_lock_enable register) can be accessed only in SMM for a secure purpose and have a capability to auto lock after a timeout.

Figure 2:
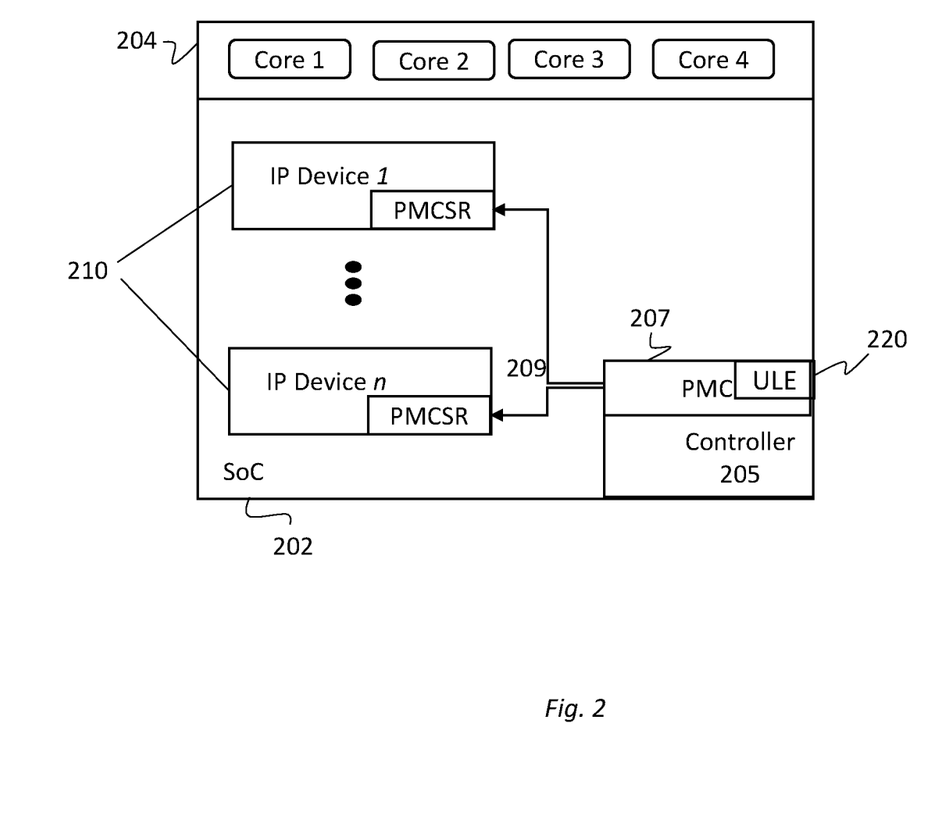
FIG. 2 schematically illustrates an exemplary SoC according to one embodiment of the disclosure.

FIG. 2 schematically illustrates an exemplary SoC according to one embodiment of the disclosure. SoC 202 may comprise an integrated circuit with integrated hardware, software and firmware. In one embodiment, SoC 202 includes integrated IP Devices 210. Each IP device may comprise a corresponding PMCSR. Exemplary IP devices may include graphics IP, storage IP and WiFi communications IP. The Core section 204 of SoC 202 may include several different functional cores. Each functional core (e.g., Core 1, Core 2, Core 3 and Core 4) may comprise and execute Operating System (OS) instructions. The instructions may be executed at SoC controller 205. SoC controller 205 comprises Power Management Controller PMC 207. PMC 207 is controlled by core 204 and it manages power to all IP devices 210 as schematically illustrated by arrows 209.

In an exemplary embodiment, new components may be added to the SoC to prevent the conventional default power down requests that control the IP devices. Among others, the new components comprise a register (so called Unlock_lock_enable Register (ULE Register)), a filter driver and PMC logic. These components are described in relation to FIGS. 3-5.

The ULE register may be formed in the SoC. In one exemplary embodiment, the ULE register may be added to, or formed in, PMC 207 (ULE register 220, FIG. 2). In one embodiment, the ULE register may only be modified in the System Management Mode (SMM). The ULE register may be tagged as confidential register and not disclosed any public domain.

Figure 3:
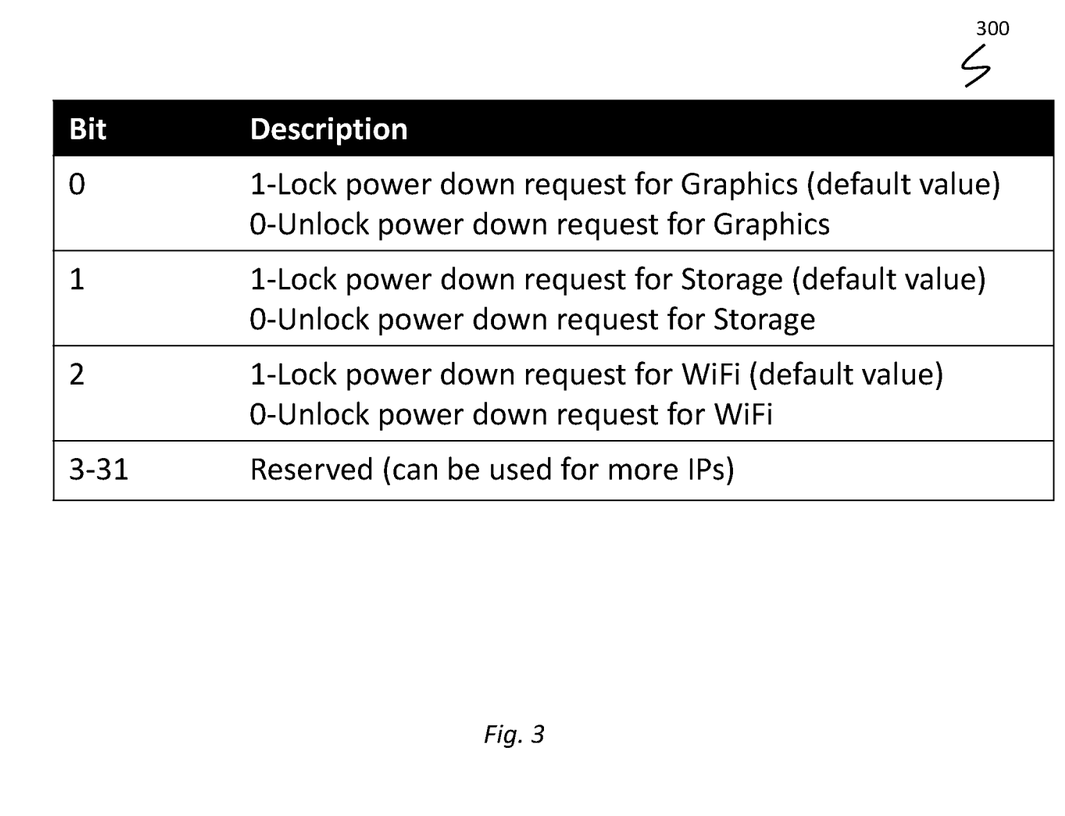
FIG. 3 shows an exemplary table depicting Unlock_lock_Enable (ULE) register states.

FIG. 3 shows an exemplary table depicting ULE register states. Table 300 is for illustrative purposes and shows the register having 32 bits. Bit 0 is assigned to Graphics IP. Bit 1 is assigned to Storage IP. Bit 2 is assigned to WiFi IP. Bits 3-31 are reserved and may be assigned to more IPs. In FIG. 3, each bit has two states, 0 and 1. Bit 1 depicts the default value, which in this case, is to locked power down for the corresponding IP device. Conversely, bit 0 is to unlock power down request for the IP device. When ULE register 300 is engaged with the default mode set to 1 (lock power down request), then SoC will default to the ULE register (220, FIG. 2) as lock enabled which will prevent power down actions to all IP devices by default.

A filter component may be added for each IP device to trap the low power request from the kernel and unlock the power down capability in the ULE register. The function of an exemplary filter driver is provided below in relation to FIGS. 4 and 5.

Figure 4:
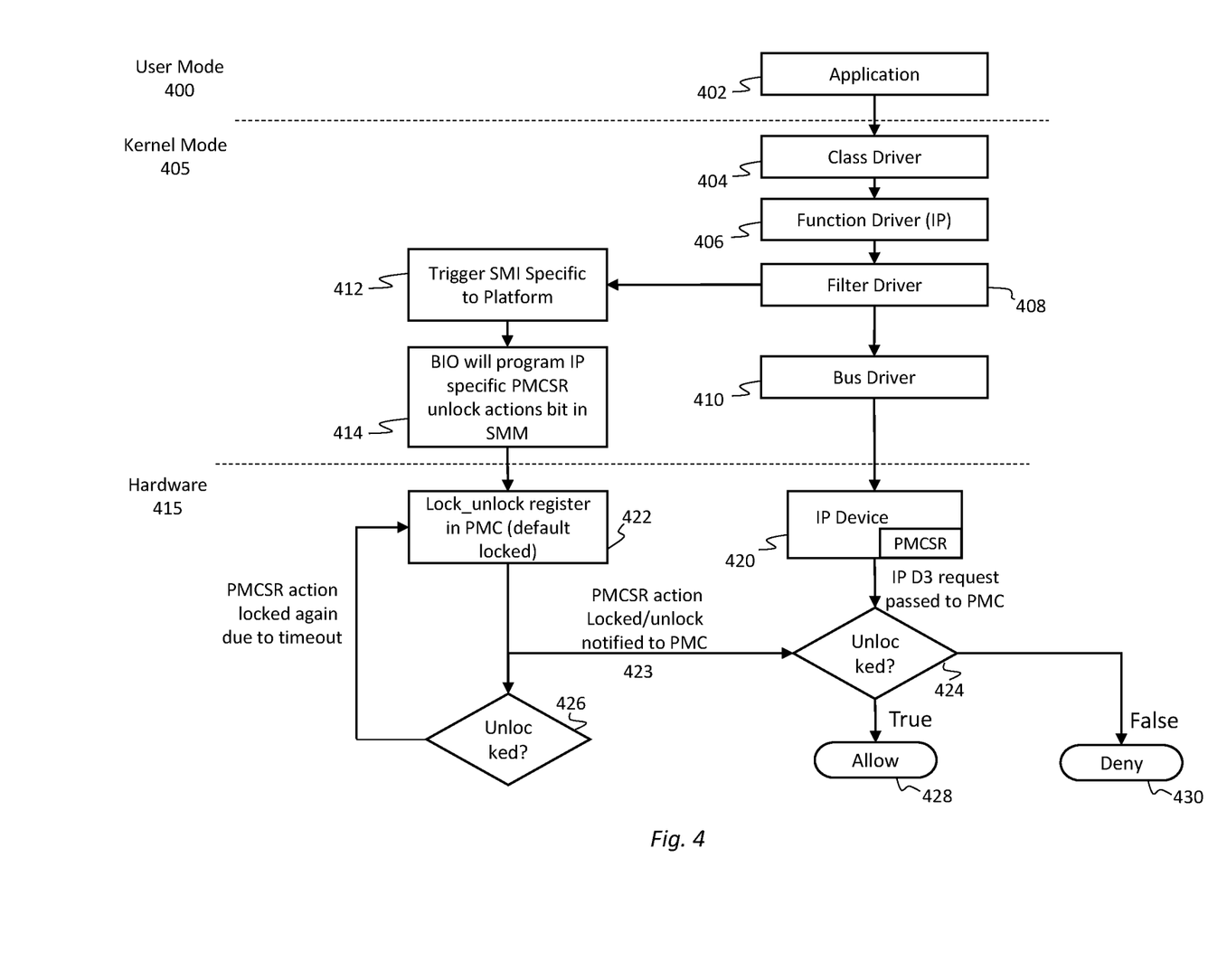
FIG. 4 illustrates an exemplary power down request which is allowed as a legitimate request according to one embodiment of the disclosure.

FIG. 4 illustrates an exemplary power down request which is allowed as a legitimate request according to one embodiment of the disclosure. Specifically, FIG. 4 shows user modes 400, kernel mode 405 and hardware layer 415. Application 402, which is a part of the user mode 400, communicates action to class driver 404 in Kernel mode 405. Class driver 404 dictates action to filter driver 408 through function driver 46. Filter driver 408 communicates to IP device 420 through bus driver 410. An action may comprise instructions that cause IP device 420 to engage in a task, for example, the instructions may require IP device 420 to enter low power mode $D_3$.

According to one embodiment, once instruction affecting device power is received at filter driver 408, the filter driver may trigger SMI specific to the platform as schematically represented by step 412. The triggered SMI will cause BIOS to program IP PMCSR unlock actions bit in SMM mode as represented by step 414. This, in turn, will cause the ULE register (220, FIG. 2) to lock or unlock in PMC 207 as represented by step 422. By way of example, if ULE register's default mode is locked, this action may cause the ULE register to unlock.

At decision step 426, the logic determines whether the ULE registered (220, FIG. 2) is unlocked and whether time-out (i.e., due to inactivity of IP device) has been reached. If affirmative, then the PMCSR actions are locked again due to timeout as indicated by arrow 427 which reverts to step 422 causing the locking of ULE register in the SOC's PMC.

Referring again to step 422, if action is taken to lock or unlock ULE register in PMC, this action is reported to decision logic 424. The PMC (not shown), which may comprise memory circuitry in communication with a processor circuitry, may store this information in its memory circuitry. At this point, the ULE register is locked.

At step 423, the action of locking or unlocking PMCSR is reported to decision logic 424. Decision logic 424, as stated, may have received a request instruction to move PMCSR of IP device 420 to power down mode $D_3$. This power down request is passed from IP device 420 to decision logic 424. In one embodiment, decision logic 424, which may be transparent to the underlying hardware, determines whether the power down request is from a legitimate source. That is, decision logic 424 decides whether the register is unlocked and PMCSR has been requested. If both conditions are true, decision logic 424 allows $D_3$ power down as well as power gating of IP device 420 as indicated by step 428. This path will be taken for a legitimate (legal) power down request and IP device 420 will be power-gated.

If both conditions of decision logic 424 (i.e., the register is unlocked and PMCSR has been requested) are not satisfied, decision logic 424 denies the power down request as indicated by step 430.

Figure 5:
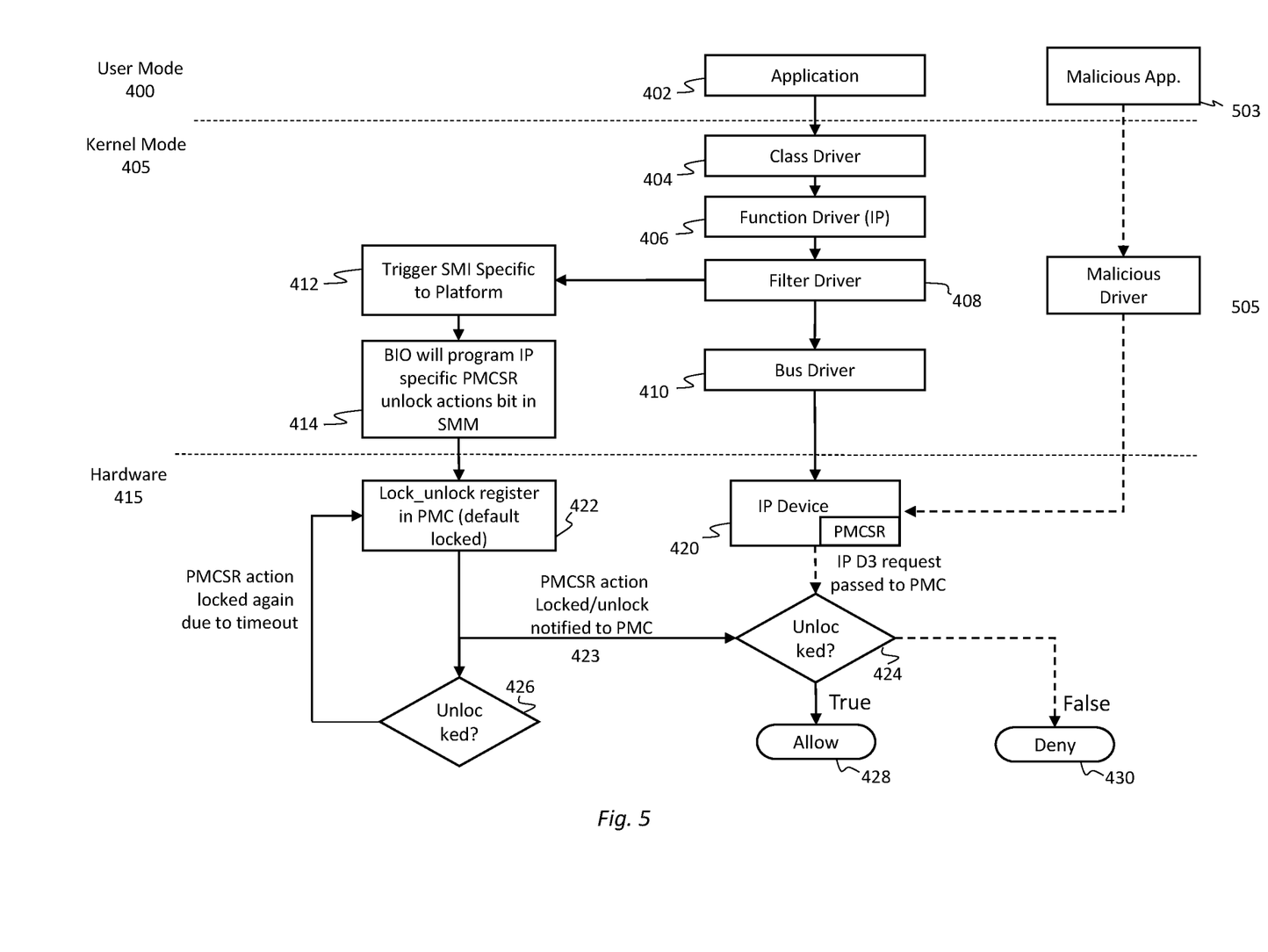
FIG. 5 illustrates an exemplary power down request which is denied to prevent a malicious (e.g., DOS) attack according to one embodiment of the disclosure.

FIG. 5 illustrates an exemplary power down request which is denied to prevent a malicious (e.g., DOS) attack according to one embodiment of the disclosure. The same numeral references are used for the portions of FIG. 5 which overlap with FIG. 4. In FIG. 5, malicious software application 503 attempts to power down IP device 420 to power state $D_3$. To this send, App. 503 directs malicious driver 505 in kernel mode 405 to directly engage PMCSR of IP device 420 and force device 420 into low power mode.

As noted above, the default mode of IP device 420 is set to lock through the ULE register (not shown). Once the malicious instructions are received, IP device 420 relays the power down instructions to logic 424. Decision logic 424 implements the same steps as discussed in relation to FIG. 4 to determine if the request is from a legitimate or malicious source. Namely, decision logic 424 determines if (i) the PMCSR register is unlocked, and (ii) PMCSR power down is requested. If the answer to both parts are true, the process proceeds to step 428, and the instructions are allowed. If the answer to both parts of the decision logic inquiry are not true, then decision logic 424 gates and denies the request do allow power down to $D_3$.

In summary, if a malicious software ties to power down an IP device, it will try to directly program the PMCSR of the IP device. However, this attempt will be denied by the ULE register in the PMC which will not grant the power down request because the power down bit is locked (default) in the ULE register. This additional protection through filter driver 408 (FIGS. 4, 5) ensures that only the legitimate driver can power down the IP and this rebuffs the malicious power down requests. Thus, the malicious driver is unable to create harmful effect because the power down actions for critical IP is disabled by default. In one embodiment, the disclosure allows legitimate power down to be implemented only inside the SMM through filter driver.

Figure 6:
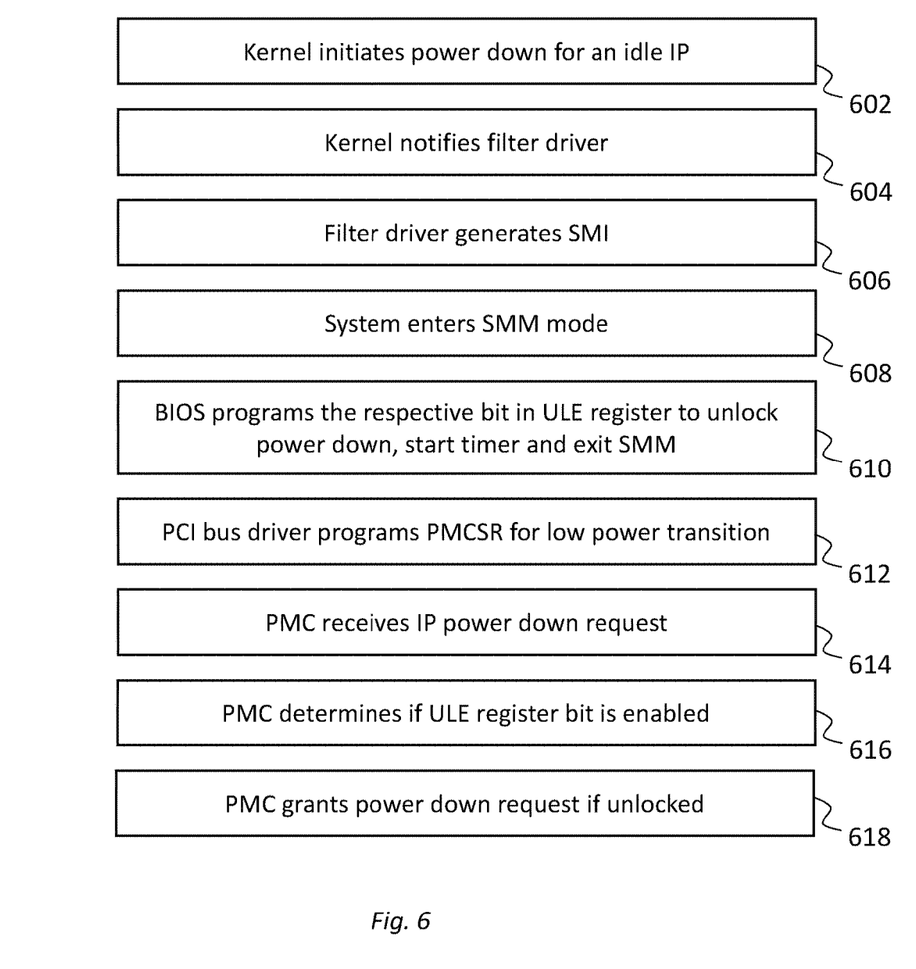
FIG. 6 is a flow diagram for powering down an IP device according to one embodiment of the disclosure

FIG. 6 is a flow diagram for powering down an IP device according to one embodiment of the disclosure. Specification, FIG. 6 shows the following steps:

Once the IP device is idle, kernel will initiate power down flow for the device (Step 602). Kernel sends notification of power down initiation to the filter driver (Step 604). Filter driver generates a software SMI (Step 606). The SMI may be configurable and may be assigned uniquely to each IP device per platform to provide an added security level. System enters SMM mode (Step 608).

Inside SMM handler, BIOS programs the respective bit in the ULE register to unlock the power down actions and exit SMM (Step 610). In addition, Timer will be enabled once the bit is unlocked to create a timeout. After the timeout, the register will auto lock the IP power down request and during this time a request to power down received at PMCSR will be accepted.

The PCI bus driver programs PMCSR for IP low power transition request (Step 612). PMC receives the IP power down request (Step 614). PMC determines if the power down action is enabled/unlocked for the respective IP in the ULE register (Step 616). If unlocked, PMC grants the power down request and will power down the IP device (Step 618).

Figure 7:
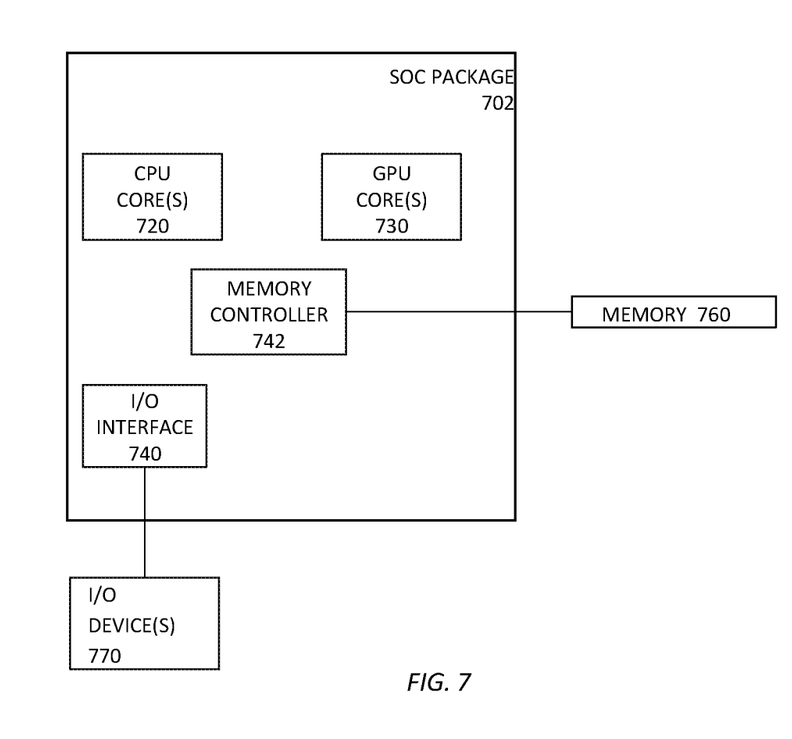
FIG. 7 illustrates a block diagram of a System on Chip package in accordance with an embodiment.

FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like.

Figure 8:
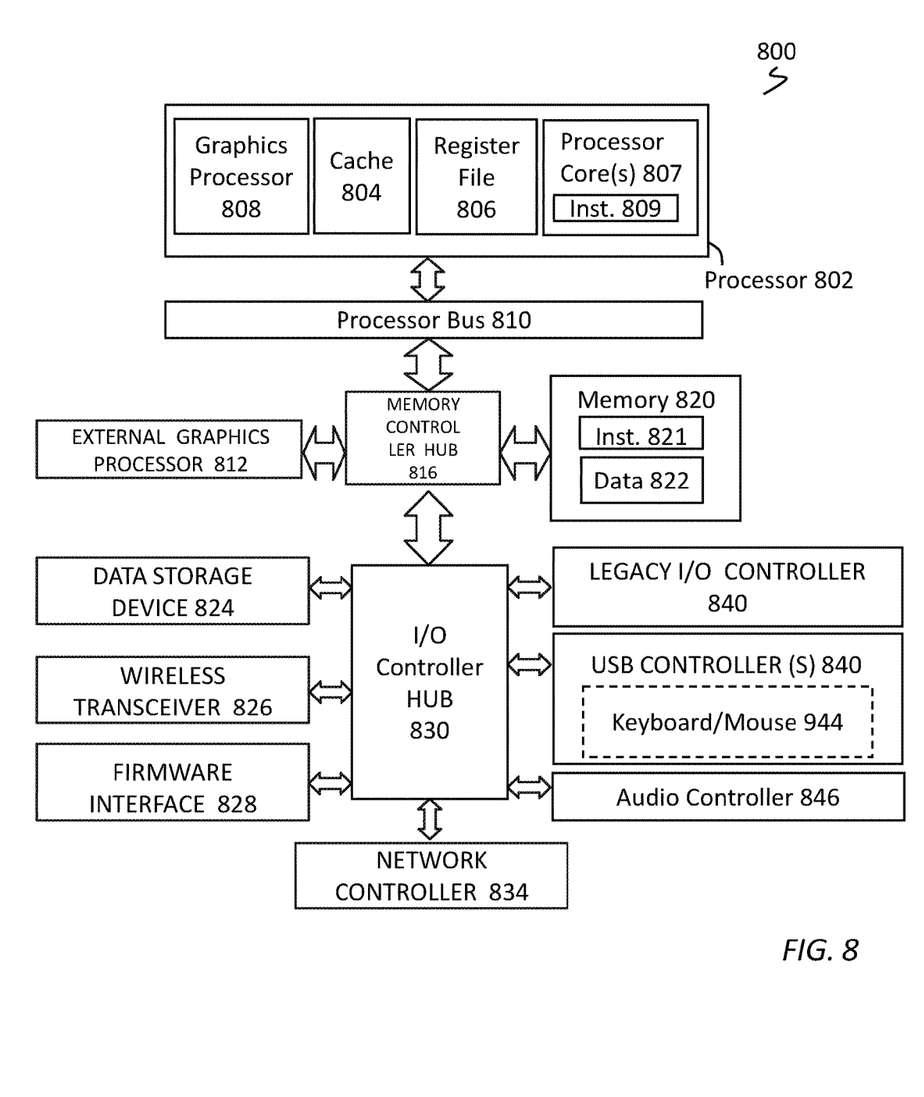
FIG. 8 is a block diagram of a processing system, according to an embodiment.

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In one embodiment, the system 800 is a processing platform incorporated within a system-on-a-chip (SoC or SOC) integrated circuit for use in mobile, handheld, or embedded devices.

An embodiment of system 800 can include or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

Additional Notes & Examples

The following non-limiting examples are provided to illustrates certain different embodiments according to different aspects of the disclosure. The examples are illustrative and non-limiting.

Examples 1 is directed to a non-transitory computer-readable medium comprising instructions to cause the processor to: initiate power down for the IP device when the IP device is idle; notify a filter driver of the power down initiation; generate a software management interrupt (SMI) message for the IP device, the SMI message configured to enable or unlock a Unlock_lock_Enable (ULE) register corresponding to the IP device in order to receive and implement a subsequent power down request; program the ULE register to allow power down during a predefined timeout period by changing a register bit of the ULE register, the ULE register corresponding to the IP device; receive the subsequent power down request and determine if the power down action is enabled/unlocked at the ULE register; and implement the subsequent power down request if the ULE register is enabled/unlocked.

Examples 2 is directed to the medium of Example 1, wherein a core portion of the operating system notifies the filter driver.

Example 3 is directed to the medium of Example 1, wherein the filter deriver generates the SMI message.

Example 4 is directed to the medium of Example 1, wherein the SMI message enables the IP device to receive the power down request for a predefined interval.

Example 5 is directed to the medium of Example 1, wherein the SMI Message engages the System Management Mode.

Example 6 is directed to the medium of Example 5, wherein a system Bios programs the ULE register bit during and exits SMM.

Example 7 is directed to the Example 6, wherein the system Bios programs a respective bit in the ULE register to allow power down of the IP device upon receipt of a power down request during a predefined timeout period and wherein after the timeout period the ULE register returns to a locked mode to prevent the IP device from powering down.

Example 8 is directed to the medium of Example 1, wherein the instructions further cause the processor to receive the subsequent power down request at Power Management Controller (PMC) of a System-On-Chip housing the IP device.

Example 9 is directed to a method to validate authenticity of a power state transition request for an IP device, the method comprising: initiating power down for the IP device when the IP device is idle; notifying a filter driver of the power down initiation; generating a software management interrupt (SMI) message for the IP device, the SMI message configured to enable or unlock enable or unlock a Unlock_lock_Enable (ULE) register corresponding to the IP device in order to receive and implement a subsequent power down request; programming the ULE register to allow power down during a predefined timeout period by changing a register bit of the ULE register, the ULE register corresponding to the IP device; receiving the subsequent power down request and determining if the power down action is enabled/unlocked at the ULE register; and implementing the subsequent power down request if the ULE register is enabled/unlocked.

Example 10 is directed to the method of Example 9, wherein a core portion of the operating system notifies the filter driver.

Example 11 is directed to the method of Example 9, wherein the filter deriver generates the SMI message.

Example 12 is directed to the method of Example 9, wherein the SMI message enables the IP device to receive the power down request for a predefined interval.

Example 13 is directed to the method of Example 9, wherein the SMI Message engages the System Management Mode.

Example 14 is directed to the method of Example 13, wherein a system Bios programs the ULE register bit during and exits SMM.

Example 15 is directed to the method of Example 14, wherein the system Bios programs a respective bit in the ULE register to allow power down of the IP device upon receipt of a power down request during a predefined timeout period and wherein after the timeout period the ULE register returns to a locked mode to prevent the IP device from powering down.

Example 16 is directed to the method of Example 9, wherein the instructions further cause the processor to receive the subsequent power down request at Power Management Controller (PMC) of a System-On-Chip housing the IP device.

Example 17 is directed to a System-On-Chip (SoC) to validate authenticity of power state transition request for an IP device, the method comprising: a register circuitry corresponding to the IP device, the register circuitry having a designated storage bit to indicate an unlocked state of the register, wherein the unlock state indicates availability of the IP device to transition power state for a timeout duration; a filter driver component to receive a first power state transition request when the IP device is idle after a predetermined period, the power state transition request defining a timeout period; a controller to change the power state of the IP device to the unlock state; a decision logic to receive and authenticate a second power state transition request in response to validation of register circuitry being unlocked.

Example 18 is directed to the SoC of Example 17, wherein the filter driver receives the first power state transition request from the SoC kernel.

Example 19 is directed to the SoC of Example 17, wherein the register circuitry is in locked state by default and wherein the timeout duration of the unlock state is predefined.

Example 20 is directed to the SoC of Example 17, wherein the filter driver is a purpose-specific inter-driver configured to trap transition state by triggering a System Management Interrupt (SMI) message.

Example 21 is directed to the SoC of Example 20, wherein the SMI message causes a change in the storage bit to render the shift register in the unlock mode.

Example 22 is directed to the SoC of Example 21, wherein the SMI message causes a BIOS application to change the storage bit to render the shift register in the unlock mode.

Example 23 is directed to the SoC of Example 17, wherein the controller comprises Power Management Controller (PMC) of the SoC.

Example 24 is directed to the SoC of Example 23, wherein the decision logic is implemented in the PMC.

While the principles of the disclosure have been illustrated in relation to the exemplary embodiments shown herein, the principles of the disclosure are not limited thereto and include any modification, variation or permutation thereof.

What is claimed is:

1. A non-transitory computer-readable medium comprising a processor circuitry and a memory circuitry in communication with the processor circuitry and including instructions to authenticate an instruction to transition power state of a core Intellectual Property (IP) device, the memory circuitry further comprising instructions to cause the processor circuitry to:
    initiate power down for the core IP device when the core IP device is idle;
    notify a filter driver of the power down initiation;
    generate a software management interrupt (SMI) message for the IP device, the SMI message configured to enable or unlock a Unlock_lock_Enable (ULE) register corresponding to the IP device in order to receive and implement a subsequent power down request;
    program the ULE register to allow power down during a predefined timeout period by changing a register bit of the ULE register, the ULE register corresponding to the IP device;
    receive the subsequent power down request and determine that the power down action is enabled and/or unlocked at the ULE register; and
    implement the subsequent power down request when the ULE register is enabled and/or unlocked.

2. The medium of claim 1, wherein a core portion of the operating system notifies the filter driver.

3. The medium of claim 1, wherein the filter deriver generates the SMI message.

4. The medium of claim 1, wherein the SMI message enables the core IP device to receive the power down request for a predefined interval.

5. The medium of claim 1, wherein the SMI Message engages the System Management Mode.

6. The medium of claim 5, wherein a system Bios programs the ULE register bit during and exits SMM.

7. The medium of claim 6, wherein the system Bios programs a respective bit in the ULE register to allow power down of the core IP device upon receipt of a power down request during a predefined timeout period and wherein after the timeout period the ULE register returns to a locked mode to prevent the core IP device from powering down.

8. The medium of claim 1, wherein the instructions further cause the processor circuitry to receive the subsequent power down request at Power Management Controller (PMC) of a System-On-Chip housing the core IP device.

9. A method to validate authenticity of a power state transition request for a core Intellectual Property (IP) device, the method comprising:
    initiating power down for the core IP device when the core IP device is idle;
    notifying a filter driver of the power down initiation;
    generating a software management interrupt (SMI) message for the core IP device, the SMI message configured to enable or unlock a Unlock_lock_Enable (ULE) register corresponding to the core IP device in order to receive and implement a subsequent power down request;
    programming the ULE register to allow power down during a predefined timeout period by changing a register bit of the ULE register, the ULE register corresponding to the core IP device;
    receiving the subsequent power down request and determining that the power down action is enabled and/or unlocked at the ULE register; and
    implementing the subsequent power down request if the ULE register is enabled and/or unlocked.

10. The method of claim 9, wherein a core portion of the operating system notifies the filter driver.

11. The method of claim 9, the filter deriver generates the SMI message.

12. The method of claim 9, wherein the SMI message enables the core IP device to receive the power down request for a predefined interval.

13. The method of claim 9, wherein the SMI Message engages the System Management Mode.

14. The method of claim 13, wherein a system Bios programs the ULE register bit during and exits SMM.

15. The method of claim 14, wherein the system Bios programs a respective bit in the ULE register to allow power down of the core IP device upon receipt of a power down request during a predefined timeout period and wherein after the timeout period the ULE register returns to a locked mode to prevent the core IP device from powering down.

16. The method of claim 9, wherein the instructions further cause the processor to receive the subsequent power down request at Power Management Controller (PMC) of a System-On-Chip housing the core IP device.

17. A System-On-Chip (SoC) to validate authenticity of a power state transition request for a core Intellectual Property (IP) device, the SoC comprising:
    a register circuitry corresponding to the IP device, the register circuitry having a designated storage bit to indicate an unlocked state of the register circuitry, wherein the unlocked state indicates availability of the IP device to transition power state for a timeout duration;
    a filter driver to receive a first power state transition request when the IP device is idle after a predetermined period, the first power state transition request defining a timeout period;
    a controller to change the power state of the IP device to the unlocked state;
    a decision logic to receive and authenticate a second power state transition request in response to validation of the register circuitry being unlocked.

18. The SoC of claim 17, wherein the filter driver receives the first power state transition request from the SoC kernel.

19. The SoC of claim 17, wherein the register circuitry is in locked state by default and wherein the timeout duration of the unlock state is predefined.

20. The SoC of claim 17, wherein the filter driver is a purpose-specific inter-driver configured to trap transition state by triggering a System Management Interrupt (SMI) message.

21. The SoC of claim 20, wherein the SMI message causes a change in the storage bit to render the shift register in the unlock mode.

22. The SoC of claim 21, wherein the SMI message causes a BIOS application to change the storage bit to render the shift register in the unlock mode.

23. The SoC of claim 17, wherein the controller comprises Power Management Controller (PMC) of the SoC.

24. The SoC of claim 23, wherein the decision logic is implemented in the PMC.

* * * * *